(12) United States Patent
Nespolo et al.

(10) Patent No.: US 9,465,043 B2
(45) Date of Patent: Oct. 11, 2016

(54) METHOD FOR MONITORING OPERATION OF A VEHICLE AND GRAPHICALLY CONVEYING G-FORCE TO A DRIVER

(71) Applicant: DENSO International America, Inc., Southfield, MI (US)

(72) Inventors: Martin Nespolo, Grosse Pointe Woods, MI (US); Kyle Golsch, Pontiac, MI (US); Sibu Varughese, Sterling Heights, MI (US); Vikas Upmanue, Farmington Hills, MI (US); Yu Zhang, Troy, MI (US); Justin McBride, South Lyon, MI (US); Laith Daman, Novi, MI (US); Cary Horvath, Dearborn, MI (US); Thomas Krzyzak, Jr., Livonia, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/616,043

(22) Filed: Feb. 6, 2015

(65) Prior Publication Data

US 2015/0219681 A1    Aug. 6, 2015

Related U.S. Application Data (60) Provisional application No. 61/936,647, filed on Feb. 6, 2014.

(51) Int. Cl.
*B60Q 1/00* (2006.01)
*G01P 1/08* (2006.01)
*G01P 1/12* (2006.01)
*B60K 37/02* (2006.01)

(52) U.S. Cl.
CPC ............... *G01P 1/08* (2013.01); *B60K 37/02* (2013.01); *G01P 1/127* (2013.01)

(58) Field of Classification Search
CPC ............ B60R 22/40; B60W 2520/00; B60W 2720/00
USPC ............ 340/439, 438, 440; 701/41; 180/197
See application file for complete search history.

(56) References Cited

U.S. PATENT DOCUMENTS

| | | | | |
|---|---|---|---|---|
| 5,610,575 | A | * | 3/1997 | Gioutsos ............ B60G 17/0162 180/282 |
| 6,038,495 | A | * | 3/2000 | Schiffmann ........... B60R 21/013 180/282 |
| 6,854,140 | B2 | * | 2/2005 | Bartels et al. ........... A61B 6/04 378/209 |
| 2007/0261162 | A1 | * | 11/2007 | Atkinson ................. E03B 1/04 4/623 |
| 2011/0153178 | A1 | | 6/2011 | Westendorf |
| 2015/0219681 | A1 | * | 8/2015 | Nespolo et al. .......... G01P 1/08 340/439 |

FOREIGN PATENT DOCUMENTS

EP             2343208 A1      7/2011

* cited by examiner

*Primary Examiner* — Phung Nguyen
(74) *Attorney, Agent, or Firm* — Harness, Dickey & Pierce, P.L.C.

(57) ABSTRACT

A method for monitoring operation of a vehicle. The method includes the following: setting a gravitational force (g-force) threshold for operation of the vehicle; measuring a g-force onboard the vehicle; and conveying to an operator of the vehicle that operation of the vehicle has resulted in the measured g-force exceeding the g-force threshold.

18 Claims, 4 Drawing Sheets

METHOD FOR MONITORING OPERATION OF A VEHICLE AND GRAPHICALLY CONVEYING G-FORCE TO A DRIVER

CROSS-REFERENCE TO RELATED APPLICATIONS

This application claims the benefit of U.S. Provisional Application No. 61/936,647, filed on Feb. 6, 2014, the entire disclosure of which is incorporated herein by reference.

FIELD

The present disclosure relates to a method for monitoring operation of a vehicle and graphically conveying g-force to a driver.

BACKGROUND

This section provides background information related to the present disclosure, which is not necessarily prior art. Teenage drivers are more likely to be in an automobile accident than any other segment of the population. One factor contributing to automobile accidents involving teenagers is that teenage drivers are generally inexperienced with, or lack knowledge of, the dynamics of driving. For example, teenage drivers typically do not yet fully understand how speed management affects high gravitational force (g-force) events, such as linear acceleration, turning, and deceleration or braking. While parents and other experienced drivers can coach teenage drivers regarding driving dynamics, they are not always present. On-board coaching applications that provide additional training would therefore be desirable. The present teachings include onboard coaching methods, systems, and devices that can provide teenage drivers with additional training, and alert third parties (such as parents or guardians) when the vehicle is being operated inappropriately.

SUMMARY

This section provides a general summary of the disclosure, and is not a comprehensive disclosure of its full scope or all of its features.

The present teachings provide for a method for monitoring operation of a vehicle. The method includes the following: setting a gravitational force (g-force) threshold for operation of the vehicle; measuring a g-force onboard the vehicle; and conveying to an operator of the vehicle that operation of the vehicle has resulted in the measured g-force exceeding the g-force threshold.

The present teachings further provide for a method for monitoring operation of a vehicle. The method includes the following: setting a gravitational force (g-force) threshold for operation of the vehicle; measuring a g-force onboard the vehicle; graphically conveying direction and magnitude of the measured g-force to an operator of the vehicle; graphically conveying to the operator that operation of the vehicle has resulted in the measured g-force exceeding the g-force threshold; measuring the operator's historical driving performance based on how many times the measured g-force has exceeded the g-force threshold; and conveying the number of times that the measured g-force has exceeded the g-force threshold visually to the driver with a historical driving performance gauge.

The present teachings also provide for a system configured to monitor operation of a vehicle. The system includes an accelerometer, a controller, and a driving performance display. The accelerometer is configured to be mounted to the vehicle to measure a gravitational force (g-force) onboard the vehicle. The controller is configured to receive an input setting a g-force threshold for operation of the vehicle, and to measure the operator's historical driving performance based on how many times the measured g-force has exceeded the g-force threshold. The driving performance display is configured to be operated by the controller to: graphically convey to an operator of the vehicle direction and magnitude of the measured g-force; graphically convey to the operator that operation of the vehicle has resulted in the measured g-force exceeding the g-force threshold; and convey to the driver with a historical driving performance gauge including a plurality of indicators the number of times the measured g-force has exceeded the g-force threshold.

Further areas of applicability will become apparent from the description provided herein. The description and specific examples in this summary are intended for purposes of illustration only and are not intended to limit the scope of the present disclosure

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
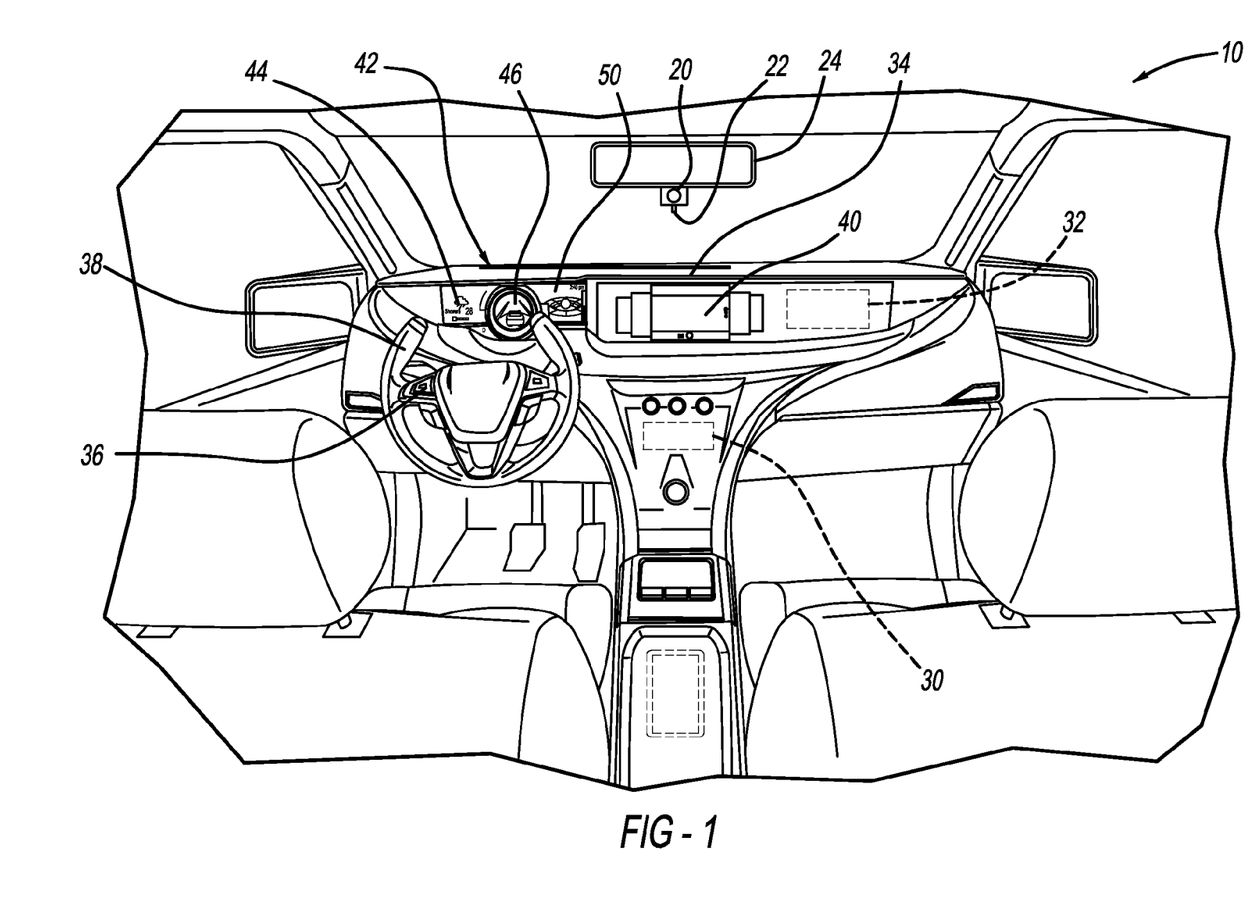
FIG. 1 illustrates a passenger cabin of a vehicle including a system according to the present teachings for monitoring operation of the vehicle.

With initial reference to FIG. 1, a vehicle passenger cabin according to the present teachings is generally illustrated at reference numeral 10. The passenger cabin 10 can be of any suitable vehicle, such as a car, truck, sport utility vehicle (SUV), van, station wagon, etc.

The passenger cabin 10 can include any suitable surveillance equipment, such as a video camera 20 and a microphone 22. The video camera 20 and the microphone 22 can be mounted at any suitable position within the passenger cabin 10, such as on a rear view mirror 24. The video camera 20 and the microphone 22 can monitor events within the passenger cabin 10 in any suitable manner, such as continuously or upon detection of the vehicle being operated inappropriately, as described in further detail herein. The video camera 20 and the microphone 22 can be connected to any suitable transmitter to transmit images and sound of events taking place within the passenger cabin 10 to one or more third parties, such as parents or guardians of those occupying the passenger cabin 10.

The passenger cabin 10 further includes a gravitational force (g-force) sensor 30. The g-force sensor 30 can be any sensor suitable for measuring g-force, such as an accelerometer. The g-force sensor 30 is configured to measure any suitable type of g-force, such as g-force during liner acceleration, linear deceleration (braking), and turning, for example. The g-force sensor 30 can be arranged at any suitable location of the vehicle.

The present teachings further provide for a controller 32. The controller 32 can be any suitable controller or processing device. For example, the controller 32 can be configured to receive an input including a g-force threshold for operation of the vehicle. The g-force threshold can be any suitable threshold, and can vary depending on the driver or operator of the vehicle. For example, the g-force threshold can be set higher for more experienced operators or drivers, such as at 0.6 g's or about 0.6 g's, and set lower for less experienced operators or drivers, such as at 0.4 g's or about 0.4 g's. The g-force threshold can be input into the controller 32 in any suitable manner. For example, the g-force threshold can be input using any suitable input device present in the passenger cabin 10, such as controls 38 present on a steering wheel 36 or controls present on a dashboard 34. The controller 32 can be configured such that the g-force threshold can be changed only by authorized personnel, such as parents or guardians of the vehicle operator, having proper credentials, such as a valid passkey. The g-force threshold can also be input remotely, such as by parents or guardians of the vehicle operator, in any suitable manner, such as by using a smartphone application. The controller 32 can be located at any suitable location of the vehicle, such as behind the dashboard 34.

The passenger cabin 10 further includes a center display 40 and an instrument cluster 42. The center display 40 can be any suitable display for conveying information to occupants of the passenger cabin 10, and/or to permit control of various systems of the passenger cabin 10, as well as to permit entry of the g-force threshold. For example, the center display 40 can be configured to permit operation of a vehicle entertainment system, a navigation system, a communication system, a climate control system, permit internet access, etc.

The instrument cluster 42 can be configured to provide any suitable type of information to the operator. For example, the instrument cluster 42 can include an information display 44, a situational awareness display 46, and/or a driving performance display 50. The information display 44 can be configured to provide any suitable information to the operator, such as weather, road conditions, speed, engine RPMs, battery status (such as in the case of a hybrid or all electric vehicle), navigation information, etc. This information may also be displayed to the driver using a heads-up display. The situational awareness display 46 can be any suitable display for informing the operator of surrounding hazards, such as other vehicles and position of the vehicle relative to the road and/or obstacles.

Figure 2:
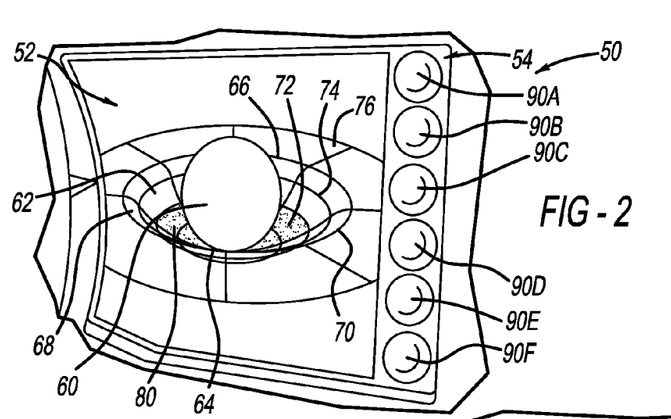
FIG. 2 illustrates a driving performance display according to the present teachings for monitoring operation of the vehicle, the display showing that gravitational force (g-force) measured onboard the vehicle is minimal or zero.

With continued reference to FIG. 1 and additional reference to FIG. 2, the driving performance display 50 can be any suitable display configured to show g-forces measured by the g-force sensor 30 during operation of the vehicle. The driving performance display 50 can be configured to visually convey the measured g-forces in any suitable manner, such as by using any suitable graphics. The display 50 can also be configured to display historical driving performance of the operator in any suitable manner, such as by using any suitable graphics. The display 50 is operated by the controller 32.

As illustrated in FIG. 2, for example, the display 50 can include a g-force indicator 52 and a historical driving performance gauge or meter 54. The g-force indicator 52 can include a sphere or ball 60, and a recess or basket 62. The basket 62 can include a front or proximal end 64, a rear or distal end 66, a left side 68, and a right side 70. The basket 62 further includes a base portion 72, an intermediate portion 74 surrounding the base portion 72, and an outer rim or lip portion 76 surrounding the intermediate portion 74. The driving performance display 50 is driven by the controller 32 such that the ball 60 moves about the basket 62 in a direction and magnitude corresponding to the g-force measured by the g-force sensor 30. In this exemplary configuration, movement of the ball 60 relative to the basket 62 is generally similar to movement of a ball in a glass of water seated on the dashboard 34. As described below, magnitude of the measured g-force can also be graphically illustrated with any suitable g-force strength or intensity signal 80, which can include illumination of portions of the basket 62, such as the base portion 72, the intermediate portion 74, or the outer rim or lip portion 76, as described in detail below.

The historical driving performance gauge 54 includes one or more driving performance indicators 90. For example, the gauge 54 can include six indicators 90A-90F. The indicators 90 can be any suitable graphical indicators, such as a plurality of balls as illustrated. The balls can be stacked vertically as illustrated. The balls may optionally be stacked within a tube. The gauge 54 provides a visual indicator of the operator's performance of the vehicle. For example and as explained further below, when the controller 32 receives an input from the g-force sensor 30 indicating that the operator has driven the vehicle in a manner such that the g-force measured by the g-force sensor 30 is greater than the predetermined g-force threshold input to the controller 32, the controller 32 will remove one of the indicators 90A-90F. On the other hand, if the controller 32 receives inputs from the g-force sensor 30 indicating that the operator has operated the vehicle for a predetermined time and/or distance without exceeding the g-force threshold, the controller 32 may be configured to add an indicator 90A-90F, such as to replace a previously subtracted indicator 90A-90F.

If the operator drives the vehicle in a manner whereby all of the indicators 90A-90F have been subtracted due to repeatedly exceeding the g-force threshold, the controller 32 can be configured to take any suitable action, such as limiting the vehicle's top speed, shutting down the vehicle's engine after giving the operator proper advance warning, generating a report of driving behavior or driving trends for self-awareness, and/or informing a third party (such as the operator's parents or guardian, or law enforcement authorities) in any suitable manner, such as with a text message or alert sent through a smartphone application. Video and audio of events taking place in the passenger cabin 10 captured using the video camera 20 and the microphone 22 may also be sent to the third party. The video camera 20 and the microphone 22 can be configured to continuously capture video and audio data, or can be controlled by the controller 32 to only activate when the controller 32 receives an input from the g-force sensor 30 indicating that the predetermined g-force threshold has been exceeded.

With continued reference to FIGS. 1 and 2, and continued reference to FIGS. 3A-6B, exemplary operation of the driving performance display 50 will now be described. With initial reference to FIG. 2, the controller 32 controls the display 50 such that the ball 60 remains within the basket 62 at the base portion 72 thereof when the g-force measured by the g-force sensor 30 is zero or about zero, such as when the vehicle is stationary, nearly stationary, or at a constant speed such that the vehicle is not substantially accelerating or decelerating. The controller 32 also controls the g-force strength signal 80 such that the base portion 72 is illuminated in any suitable manner with any suitable color, such as green to indicate that the g-force measured by the g-force sensor 30 is below the g-force threshold.

Figures 3A, 3B:
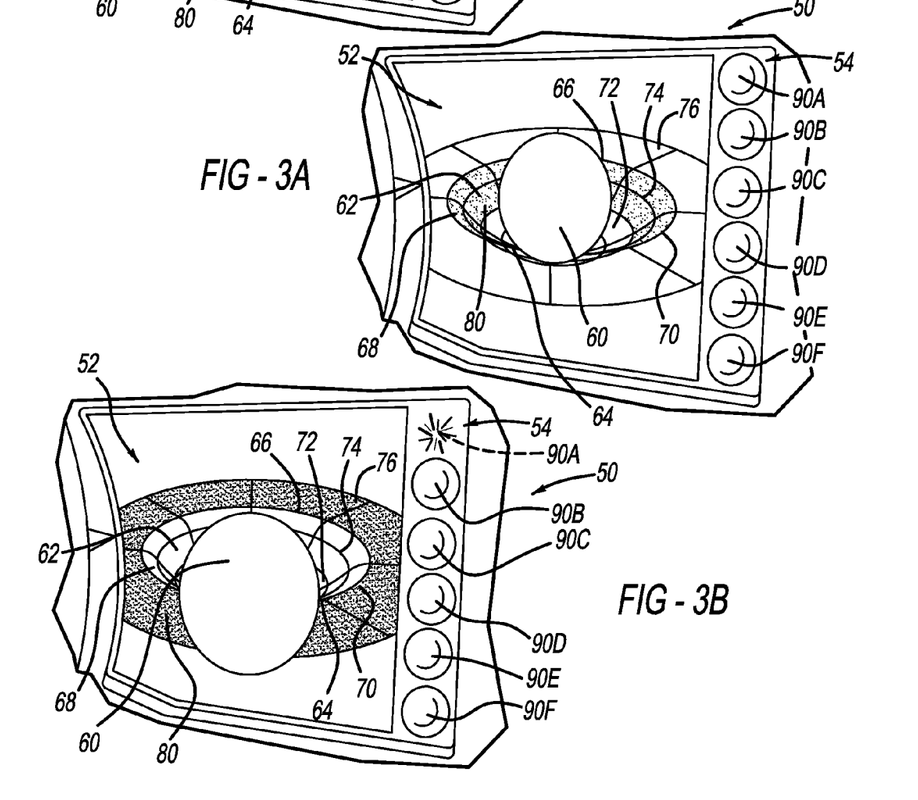
FIG. 3A illustrates the driving performance display according to the present teachings showing that g-force measured onboard the vehicle is greater than zero and less than or equal to a predetermined g-force threshold during acceleration of the vehicle.
FIG. 3B illustrates the driving performance display showing that g-force measured onboard the vehicle is greater than the predetermined g-force threshold during acceleration of the vehicle resulting in loss of a driving performance indicator from a historical driving performance gauge.

With reference to FIG. 3A, when the g-force sensor 30 measures a g-force greater than zero but less than or equal to the g-force threshold during acceleration of the vehicle, the controller 32 moves the ball towards the proximal end 64 of the basket 62, and from the base portion 72 to the intermediate portion 74 to convey the acceleration and measured g-force visually to the operator. The controller 32 will control the g-force strength signal 80 so that the intermediate portion 74 of the basket 62 will illuminate, such as in green or yellow for example to notify the operator that the g-force measured by the g-force sensor 30 is approaching the g-force threshold.

With reference to FIG. 3B, when the g-force sensor 30 measures a g-force greater than the g-force threshold during operation of the vehicle, the controller 32 moves the ball 60 out from within the basket 62 at the proximal end 64 of the basket 62. The controller 32 provides the g-force strength signal 80 at the outer rim or lip portion 76 by illuminating the portion 76 in any suitable color, such as red to indicate that the g-force threshold has been exceeded. The controller 32 will also subtract one of the driving performance indicators 90 from the historical driving performance gauge 54, such as the indicator ball 90A, because the operator impermissibly exceeded the g-force threshold.

Figures 4A, 4B, 5A:
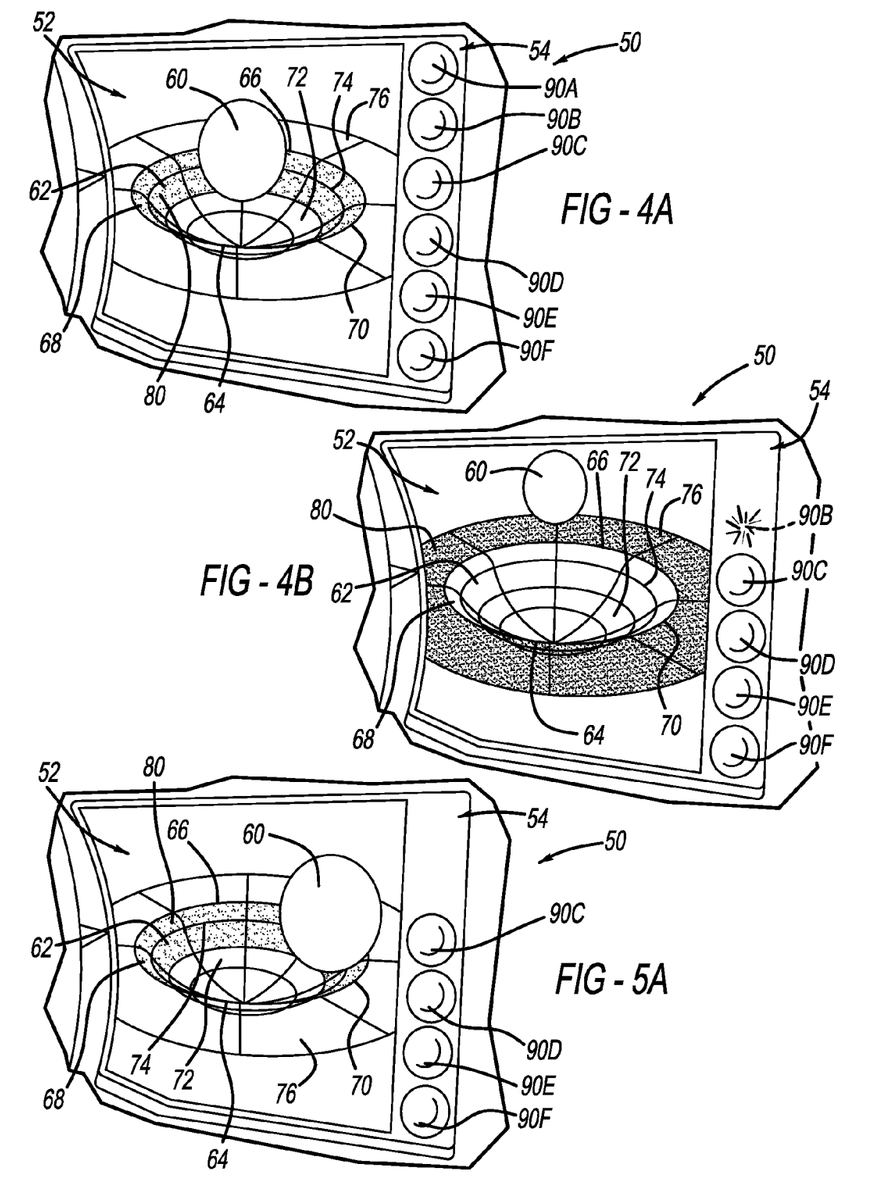
FIG. 4A illustrates the driving performance display showing that g-force measured onboard the vehicle is greater than zero and less than or equal to the predetermined g-force threshold during deceleration or braking of the vehicle.
FIG. 4B illustrates the driving performance display showing that g-force measured onboard the vehicle is greater than the predetermined g-force threshold during deceleration or braking of the vehicle resulting in loss of a driving performance indicator from a historical driving performance gauge.
FIG. 5A illustrates the driving performance display showing that g-force measured onboard the vehicle is greater than zero and less than or equal to the predetermined g-force threshold during non-linear acceleration of the vehicle when the vehicle is turned to the left.

With reference to FIG. 4A, when the g-force sensor 30 measures a g-force greater than zero but less than or equal to the g-force threshold during deceleration or braking, the controller 32 moves the ball 60 towards the rear or distal end 66 of the basket 62, and from the base portion 72 to the intermediate portion 74 to convey the deceleration and measured g-force visually to the operator. The controller 32 will control the g-force strength signal 80 so that the intermediate portion 74 of the basket 62 will illuminate, such as in green or yellow for example to notify the operator that the g-force measured by the g-force sensor 30 is approaching the g-force threshold.

With reference to FIG. 4B, when the g-force sensor 30 measures a g-force greater than the g-force threshold during deceleration or braking, the controller 32 moves the ball 60 out from within the basket 62 at the rear or distal end 66 of the basket 62. The controller 32 provides the g-force strength signal 80 at the outer rim or lip portion 76 by illuminating the portion 76 in any suitable color, such as red to indicate that the g-force threshold has been exceeded. The controller 32 will also subtract one of the driving performance indicators 90 from the historical driving performance gauge 54, such as the indicator ball 90B, because the operator impermissibly exceeded the g-force threshold.

With reference to FIG. 5A, when the g-force sensor measures a g-force greater than zero but less than or equal to the g-force threshold when the vehicle is turned to the left, the controller 32 moves the ball 60 towards the right side 70 of the basket 62, and from the base portion 72 to the intermediate portion 74 to convey the left-hand turn and the measured g-force visually to the operator. The controller 32 will control the g-force strength signal 80 so that the intermediate portion 74 of the basket 62 will illuminate, such as in green or yellow for example to notify the operator that the g-force measured by the g-force sensor 30 is approaching the g-force threshold.

Figures 5B, 6A, 6B:
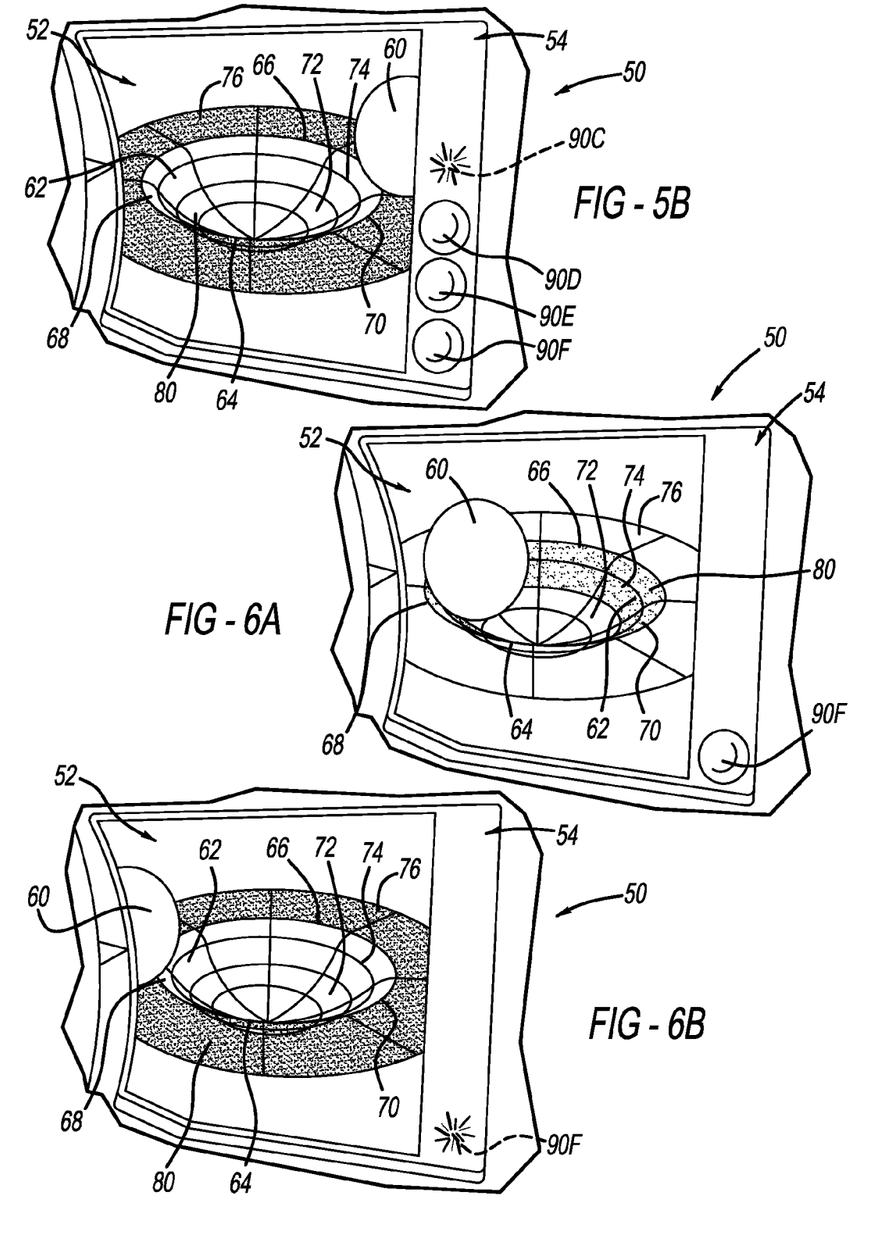
FIG. 5B illustrates the driving performance display showing that g-force measured onboard the vehicle is greater than the predetermined g-force threshold during non-linear acceleration of the vehicle when the vehicle is turned to the left, resulting in loss of a driving performance indicator from a historical driving performance gauge.
FIG. 6A illustrates the driving performance display showing that g-force measured onboard the vehicle is greater than zero and less than or equal to the predetermined g-force threshold during non-linear acceleration of the vehicle when the vehicle is turned to the right.
FIG. 6B illustrates the driving performance display showing that g-force measured onboard the vehicle is greater than the predetermined g-force threshold during non-linear acceleration of the vehicle when the vehicle is turned to the right, resulting in loss of a driving performance indicator from a historical driving performance gauge.

With reference to FIG. 5B, when the g-force sensor 30 measures a g-force greater than the g-force threshold when the vehicle is turning left, the controller 32 moves the ball 60 out from within the basket 62 at the right side 70 of the basket 62. The controller 32 provides the g-force strength signal 80 at the outer rim or lip portion 76 by illuminating the portion 76 in any suitable color, such as red to indicate that the g-force threshold has been exceeded. The controller 32 will also subtract one of the driving performance indicators 90 from the historical driving performance gauge 54, such as the indicator ball 90C, because the operator impermissible exceeded the g-force threshold.

With reference to FIG. 6A, when the g-force sensor measures a g-force greater than zero but less than or equal to the g-force threshold when the vehicle is turned to the right, the controller 32 moves the ball 60 towards the left side 68 of the basket 62, and from the base portion 72 to the intermediate portion 74 to convey the right-hand turn and the measured g-force visually to the operator. The controller 32 will control the g-force strength signal 80 so that the intermediate portion 74 of the basket 62 will illuminate, such as in green or yellow for example to notify the operator that the g-force measured by the g-force sensor 30 is approaching the g-force threshold.

With reference to FIG. 6B, when the g-force sensor 30 measures a g-force greater than the g-force threshold when the vehicle is turning right, the controller 32 moves the ball 60 out from within the basket 62 at the left side 68 of the basket 62. The controller 32 provides the g-force strength signal 80 at the outer rim or lip portion 76 by illuminating the portion 76 in any suitable color, such as red to indicate that the g-force threshold has been exceeded. The controller 32 will also subtract one of the driving performance indicators 90 from the historical driving performance gauge 54, such as the indicator ball 90F because the operator impermissible exceeded the g-force threshold (the indicator balls 90D and 90E having been previously removed due to the operator having exceeded the g-force threshold).

When all of the driving performance indicators 90A-90F have been removed, the controller 32 will take any suitable predetermined action. For example and as described above, the controller 32 can be configured to limit the vehicle's top speed, shut down the vehicle's engine after giving the operator proper advance warning, inform a third party (such as the operator's parents or guardian, or law enforcement authorities) in any suitable manner, such as with a text message or alert sent through a smartphone application. Video and audio of events taking place in the passenger cabin 10 captured using the video camera 20 and the microphone 22 may also be sent to the third party. The video and audio can be sent to the third party not only when the g-force threshold has been exceeded, but also when the vehicle is operated below the g-force threshold for a predetermined period of time or distance of travel such that the controller 32 adds a driving performance indicator 90 to the gauge 54.

The present teachings thus advantageously provide a graphic in a vehicle instrument cluster that indicates how appropriately a driver is handling high gravity events. The present teachings improve speed management when performing high gravity events in an automobile, such as accelerating, turning, and stopping (decelerating) by coaching drivers through the use of graphics that are displayed in an instrument cluster 42 of the vehicle. The graphics can include the ball 60 floating in the basket-like enclosure 62 as illustrated in the figures, or any other suitable graphics. It will be the operator's goal to keep the ball 60 in the basket 62, which happens as long as gravity events do not exceed the predetermined g-force threshold, such as 0.6 g or 0.4 g, for example. If the vehicle exceeds the predetermined g-force threshold, the ball 60 will roll out of the basket 62, signaling that the operator has taken undesirable or inappropriate action.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for monitoring operation of a vehicle comprising:
setting a gravitational force (g-force) threshold for operation of the vehicle;
measuring a g-force onboard the vehicle;

visually conveying to an operator of the vehicle that operation of the vehicle has resulted in the measured g-force exceeding the g-force threshold;

visually conveying the measured g-force with a graphical display controlled by a controller, the graphical display including a g-force directional indicator movable relative to a base portion surrounded by a proximal end, a distal end, a left side, and a right side; and positioning the g-force directional indicator at a first position relative to the base portion when the measured g-force is equal to or below the g-force threshold, and positioning the g-force directional indicator at a second position relative to the base portion when the measured g-force is greater than the g-force threshold, the second position is further from the base portion than the first position.

2. The method of claim 1, further comprising setting the g-force threshold to 0.6 g.

3. The method of claim 1, further comprising setting the g-force threshold to 0.4 g.

4. The method of claim 1, further comprising setting the g-force threshold based on operator driving experience such that the g-force threshold is higher for more experienced operators.

5. The method of claim 1, wherein the g-force directional indicator is a ball movable relative to a basket including the proximal end, the distal end, the left side, and the right side; and wherein the method further comprises moving the ball in a direction corresponding to the direction of the measured g-force such that: the ball moves towards the proximal end of the basket during vehicle acceleration, the ball moves towards the distal end of the basket during vehicle deceleration, the ball moves towards the right side of the basket when the vehicle turns left, and the ball moves towards the left side of the basket when the vehicle turns right.

6. The method of claim 1, further comprising illuminating the base portion of the graphical display when the vehicle is stationary or nearly stationary, illuminating an intermediate portion of the graphical display when the measured g-force is greater than zero and equal to or less than the g-force threshold, and illuminating an outer rim portion of the graphical display when the measured g-force is greater than the g-force threshold.

7. The method of claim 1, further comprising measuring the g-force using an accelerometer.

8. The method of claim 1, further comprising at least one of: measuring the operator's historical driving performance based on how many times the measured g-force exceeds the threshold; alerting a third party external to the vehicle when the number of times that the measured g-force has exceeded the threshold is greater than a predetermined limit; and generating a report of driving behavior or driving trends for self-awareness.

9. The method of claim 1, further comprising: measuring the operator's historical driving performance based on how many times the measured g-force exceeds the threshold; and conveying the number of times the measured g-force has exceeded the threshold visually to the driver with a historical driving performance gauge.

10. The method of claim 9, wherein the gauge includes a plurality of indicators; the method further comprising subtracting one of the plurality of indicators each time the measured g-force exceeds the threshold, and adding one of the plurality of indicators after the vehicle is operated such that the measured g-force is at or below the threshold for a predetermine period of time or distance traveled.

11. A method for monitoring operation of a vehicle comprising:

setting a gravitational force (g-force) threshold for operation of the vehicle;

measuring a g-force onboard the vehicle;

graphically conveying direction and magnitude of the measured g-force to an operator of the vehicle;

graphically conveying to the operator that operation of the vehicle has resulted in the measured g-force exceeding the g-force threshold;

measuring the operator's historical driving performance based on how many times the measured g-force has exceeded the g-force threshold; and conveying the number of times that the measured g-force has exceeded the g-force threshold visually to the driver with a historical driving performance gauge.

12. The method of claim 11, further comprising setting the g-force threshold based on operator experience such that the g-force threshold is higher for more experienced vehicle operators.

13. The method of claim 11, further comprising subtracting one of a plurality of indicators included with the gauge each time the measured g-force exceeds the g-force threshold.

14. The method of claim 11, further comprising:

conveying the measured g-force with a graphical display controlled by a controller, the graphical display including a ball and a basket, the ball remains within the basket when the measured g-force is equal to or below the g-force threshold, and the ball moves out from within the basket when the measured g-force is above the g-force threshold;

moving the ball in a direction corresponding to the direction of the measured g-force such that the ball moves towards a front of the basket during vehicle acceleration, the ball moves towards a rear of the basket during vehicle deceleration, the ball moves towards a right side of the basket when the car turns left, and the ball moves towards a left side of the basket when the car turns right;

illuminating a base portion of the basket when the vehicle is stationary or nearly stationary, illuminating an intermediate portion of the basket when the measured g-force is greater than zero and equal to or lower than the g-force threshold, and illuminating an outer rim portion of the basket when the measured g-force is greater than the g-force threshold; and sending an alert for a third party external to the vehicle when the number of times that the measured g-force has exceeded the threshold is greater than a predetermined limit, the alert including video and audio of the operator's driving performance.

15. A system configured to monitor operation of a vehicle comprising:

an accelerometer configured to be mounted to the vehicle to measure a gravitational force (g-force) onboard the vehicle;

a controller configured to receive an input setting a g-force threshold for operation of the vehicle, and to measure the operator's historical driving performance based on how many times the measured g-force has exceeded the g-force threshold; and a driving performance display configured to be operated by the controller to:

graphically convey to an operator of the vehicle direction and magnitude of the measured g-force;

graphically convey to the operator that operation of the vehicle has resulted in the measured g-force exceeding the g-force threshold; and convey to the driver the number of times the measured g-force has exceeded the g-force threshold with a historical driving performance gauge including a plurality of indicators.

16. The system of claim 15, wherein controller is configured to subtract one of the plurality of indicators each time the measured g-force exceeds the g-force threshold.

17. The system of claim 16, wherein the controller is configured to at least one of:

generate an alert for a third party external to the vehicle when the number of times that the measured g-force exceeds the threshold is greater than a predetermined limit;

add one of the plurality of indicators when the vehicle is operated at or below the g-force threshold for a predetermined distance of travel; and generate a report of driving behavior or driving trends for driver self-awareness.

18. The system of claim 17, wherein the alert includes video of the operator's performance before, during, and after the measured g-force exceeds the g-force threshold.

* * * * *